Figure 1:
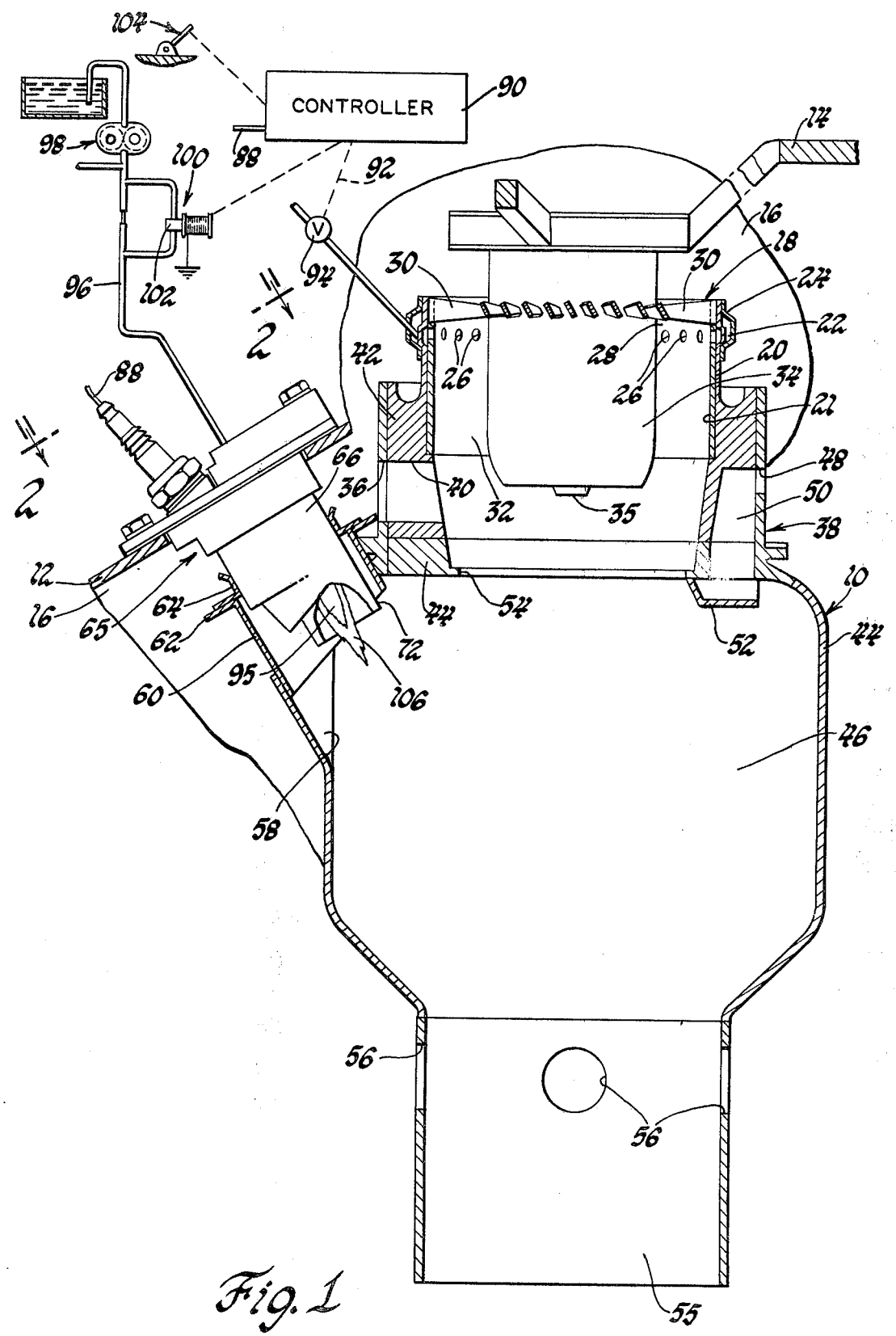

United States Patent [19]

Stettler

[11] 4,301,656
[45] Nov. 24, 1981

[54] LEAN PRECHAMBER OUTFLOW COMBUSTOR WITH CONTINUOUS PILOT FLOW

[75] Inventor: Richard J. Stettler, Birmingham, Mich.

[73] Assignee: General Motors Corporation, Detroit, Mich.

[21] Appl. No.: 79,872

[22] Filed: Sep. 28, 1979

[51] Int. Cl.³ ............................. F23R 3/14; F23R 3/30; F23R 3/34

[52] U.S. Cl. .......................................... 60/737; 60/743; 60/748; 60/39.82 P

[58] Field of Search ............................. 60/39.82 P, 737

[56] References Cited

U.S. PATENT DOCUMENTS

| | | | |
|---|---|---|---|
| 3,954,389 | 5/1976 | Szetela | 431/353 |
| 4,012,904 | 3/1977 | Nagle | 60/39.82 P |
| 4,141,213 | 2/1979 | Ross | 60/39.82 P |
| 4,192,139 | 3/1980 | Buchheim | 60/39.82 P |

Primary Examiner—Robert E. Garrett
Attorney, Agent, or Firm—J. C. Evans

[57] ABSTRACT

A combustor assembly for an automotive gas turbine engine includes a continuously ignited, pilot flame tube supported on a combustor dome immediately downstream of a prevaporization prechamber with a fuel and air swirler. The pilot flame tube has an air swirler and fuel nozzle supported on an interior bulkhead and is associated with a fuel system that maintains a shielded pilot flame to prevent flame-out of flammable air/fuel mixtures in the main reaction chamber of the combustor; the fuel system supplies greater fuel to the pilot flame tube at engine fuel start and stop to produce an extended flame plume that extends into the reaction chamber to burn residuum of fuel when the air/fuel ratio in the main reaction chamber mixture is below the flammability limit of the fuel.

4 Claims, 4 Drawing Figures

LEAN PRECHAMBER OUTFLOW COMBUSTOR WITH CONTINUOUS PILOT FLOW

This invention relates to gas turbine engine combustor assemblies and more particularly to automotive gas turbine engines having continuous ignition systems.

In order to control combustion emissions in automotive gas turbine engine drive systems, combustors include a prevaporization chamber in which air and fuel is mixed prior to discharge into a primary combustion zone therein.

Swirler vanes located upstream of the prevaporization chamber produce mixture of a fuel film with primary air and a pilot nozzle and igniter assembly located centrally of the prevaporization chamber will ignite the mixed air and fuel as it passes from the prevaporization chamber into the combustor. One such arrangement is set forth in U.S. Pat. No. 3,930,369, issued Jan. 6, 1976, to Verdouw. In such arrangements, fuel from the pilot fuel nozzle is ignited to start combustion, particularly when the engine is cold and before effective evaporation of fuel from the prechamber wall is attained. In such cases, the pilot nozzle is turned off when a flame front is produced in the reaction chamber.

An object of the present invention is to provide an improved pilot flame tube for maintaining a continuous pilot flame within a primary combustion zone of an automotive gas turbine engine combustor and wherein means are included to shield the pilot flame tube against blowout during engine operation from idle to full gasifier speed and wherein further means are included to produce an extended pilot flame at engine fuel start and stop which flares outwardly into the reaction chamber to directly burn fuel in air/fuel mixtures of residuum fuel below the flammability limit of the fuel.

Another object of the invention is to provide an improved pilot flame tube for maintaining a continuous pilot light in the reaction chamber of a combustor assembly, said pilot flame tube including a pilot fuel nozzle with an air swirler thereon supported concentrically within a flame tube shield which attaches to a support flange also supporting a spark igniter with electrodes located at an outlet portion of the shield within the main combustor reaction zone and wherein the support flange also supports a flame rod that senses ionization produced by ignition of pilot fuel to produce a signal to initiate flow of main fuel to the reaction zone where it produces a flame front maintained against blowout by a continuously ignited pilot flame shielded from gas flow through the primary combustion zone following flow of main fuel quantities.

Another object of the present invention is to provide an improved pilot assembly for an automotive gas turbine engine having a fuel supply for a combustor of the type including a primary inlet prechamber for prevaporization of fuel and mixing of fuel with air and an outer combustor wall connected to the outlet end of the prechamber to define a main reaction chamber and including an annular flash preventor therebetween, the improved pilot being operative to maintain a continuous ignition flame within the primary combustion zone during engine operation to burn multiple sources of fuel/air mixtures from the prevaporization prechamber; and wherein the continuously operated pilot flame tube assembly is located downstream of the multiple fuel/air mixtures to prevent premature flame-out of the main reaction chamber combustion during engine operation and the multiple fuel/air sources being operative to produce a residuum of unburned hydrocarbons and air mixture with an air-to-fuel ratio below the flammability limit of the fuel in the fuel/air mixture at the outlet of the prechamber at both engine fuel start and stop, the pilot assembly including a first fuel supply operative during engine operation from start to stop to produce a first pilot flame fuel flow to generate a pilot flame located entirely within a shield tube of the pilot flame tube assembly to prevent blowout of the pilot flame during gas flow thereacross produced from idle to full power engine operation; and the pilot assembly including fuel level control means with a step-controlled valve operative at both engine fuel start and engine fuel stop to produce a greater flow of fuel at engine fuel start and stop to the pilot flame tube assembly thereby to produce an extended flame plume that flares outwardly of the shield tube of said pilot assembly into the main reaction chamber to intersect unburned residuum of fuel and operative to combust the residuum of fuel to reduce the total hydrocarbon emissions from the combustor.

Further objects and advantages of the present invention will be apparent from the following description, reference being had to the accompanying drawings wherein a preferred embodiment of the present invention is clearly shown.

Figure 2:
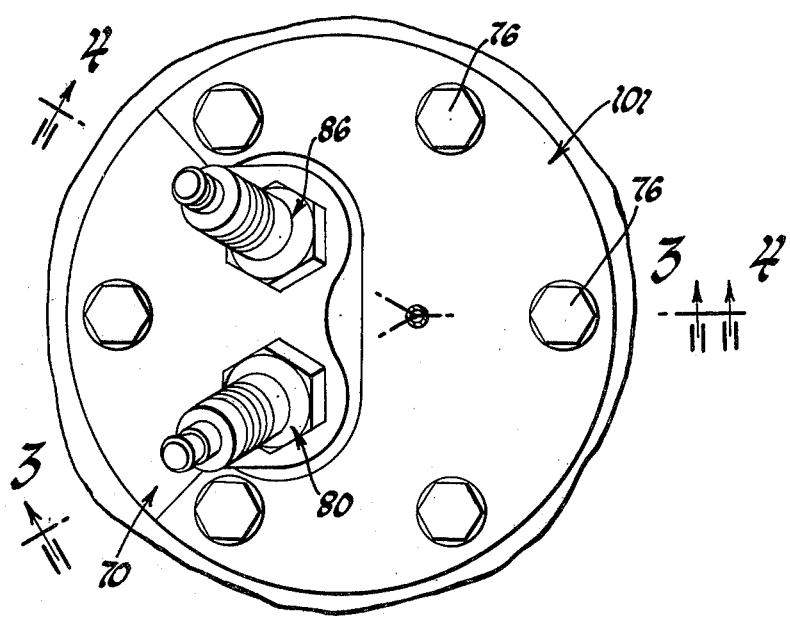
Figure 3:
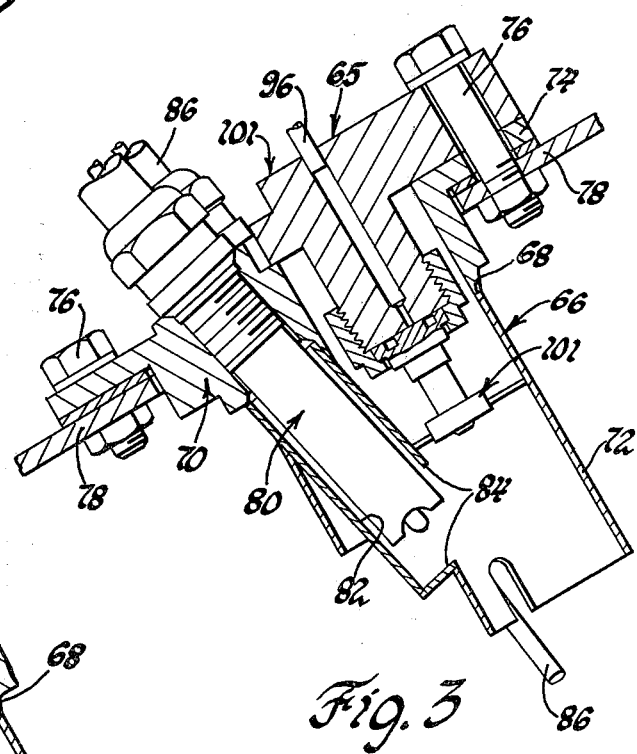
Figure 4:
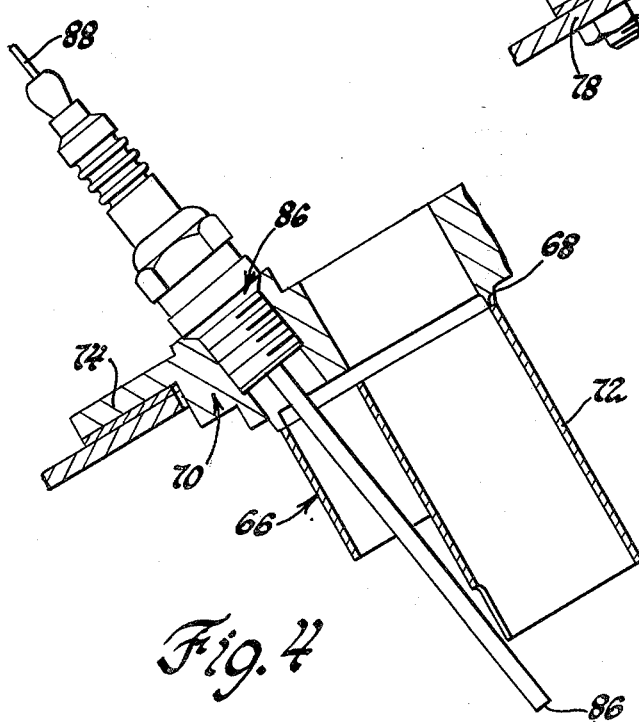

FIG. 1 is a longitudinal sectional view view of a combustor showing the pilot flame tube and fuel supply system of the present invention;

FIG. 2 is a top elevational view of the assembly in FIG. 1 looking in the direction of the arrows 2—2 therein; and FIGS. 3 and 4 are enlarged longitudinal sectional views of the pilot assembly taken along the lines 3—3, 4—4 of FIG. 2.

Referring now to the drawings, an automotive gas turbine engine combustor 10 is illustrated for association with a gas turbine engine having a plenum case 12 in surrounding relationship thereto, a portion of which is shown in FIG. 1. A strut 14 is secured to the combustor 10 for locating it with respect to the plenum 12.

Further details of such engines and combustor assemblies are set forth in U.S. Pat. No. 3,930,369, issued Jan. 6, 1976, to Verdouw; and in U.S. Pat. No. 3,077,074, issued Feb. 12, 1963, to Coleman et al; in U.S. Pat. No. 3,267,674, issued Aug. 23, 1966, to Coleman et al and U.S. Pat. No. 3,490,746, issued Jan. 20, 1970, to Bell.

The case plenum defines a pressurizable chamber 16 around the combustor 10 into which a gasifier spool compressor delivers compressed combustor air which may be heated by a regenerator prior to passage into the chamber 16. The combustor 10 includes a fuel and air inlet 18 including a tubular prevaporization chamber wall 20 having a roughened inside surface 21. Fuel is supplied through an annular inlet manifold 22 with a surrounding air cooling jacket 24. The manifold 22 is communicated with the inner surface 21 of wall 20 by a plurality of circumferentially spaced fuel ports 26 at the inlet end 28 of the wall 20 to flow as a film across surface 21. The inlet end 28 also includes an annular row of air swirler vanes 30 through which air passes from the chamber 16 into a prevaporization chamber 32 formed around a center body 34 supported by the swirler vanes 30 concentrically within the chamber 32. Center body 34 also serves as a point of connection for the struts 14 to secure the combustor 10 in place.

A pilot fuel nozzle 35 is mounted in the prechamber for center body 34. This nozzle is preferably of an air-atomizing type supplied with compressed air and fuel. With this type of fuel nozzle, the fuel is sprayed in fine droplets by an air blast. The pilot fuel nozzle is provided for starting combustion, particularly when the engine is cold and therefore evaporation of fuel from the prechamber wall is not effective. The pilot nozzle is turned off after normal operation has begun. Other starting expedients such as use of gaseous fuel may be employed, but are not considered as feasible as the use of the pilot nozzle.

Primary combustion air also is directed into the prechamber 32 through a plurality of swirler passages 36 formed in a swirler 38 and through an aligned passage 40 in an outer liner 42 that is connected to one end of a combustor wall 44 that surrounds a primary reaction chamber or combustion zone 46 located downstream of the prevaporization chamber 32. Primary air also is directed to the primary reaction chamber 46 through a plurality of bypass passages 48 formed in the outer liner 42 at circumferential space points thereon to communicate with an axial opening 50 in swirler 38 to supply primary air directly into the reaction chamber 46 where swirlers 52 produce mixing of the bypassed air with air/fuel flow through a flash prevention dam 54 on liner 42 at the outlet of chamber 32. A dilution zone 55 is communicated with the pressurizable chamber 16 through a plurality of dilution air flow ports 56.

Air flow through the dilution ports 56 completes the combustion process within the dilution zone 55 prior to passage of exhaust gases through a turbine nozzle and across a turbine for providing engine power output.

Compressed air in the chamber 16 is directed through the row of swirler vanes 30 to be directed tangentially with respect to the inside of the prechamber wall 20 where it blows fuel introduced through the ports 26 along the inner surface of the wall 20. The hot, rapidly moving air from the swirler vanes 30 heats and vaporizes fuel and thoroughly mixes it prior to entry into the primary combustion zone 46.

In addition to air introduced to the swirler 30, the illustrated arrangement includes provision for another set of radially inwardly directed air entrance points distributed near the outlet of the prechamber 32 as defined by passages 36.

Air flow through the passages 36 can be varied by movable control components if desired to increase primary air flow with increases in fuel flow from manifold 22. Moreover, these valve components can be correlated to concurrently regulate the amount of air flow through the bypass passages 50 and dilution ports 56 as desired.

The combustor 10 and the air/fuel flow paths therein for both prevaporization of fuel flow from the ports 26 and for mixture and combustion in the primary combustion zone 46 as well as for final combustion within the dilution zone 55 are representative of combustors suitable for use with the present invention. Moreover, they are set forth as a type of gas turbine engine combustor typically found in automotive gas turbine engines where engine fuel control often requires combustion starts and operation under a wide range of conditions. For example, starts can occur when the engine is cold and prior to effective evaporation within the prevaporization chamber 32. Starts also can occur following flame-out produced under conditions where air and fuel flow to the engine are reduced as, for example, under deceleration conditions. Under such conditions, it is desirable to include a continuously operated pilot flame exposed to the primary combustion zone 46 so as to assure continuous ignition of air/fuel mixtures directed therethrough, both from nozzle 35 and from manifold 22 which represent multiple air/fuel mixture sources upstream of the reaction chamber 46.

More particularly, the combustor wall 44 includes a port 58 therein in which is located a pilot flame support tube 60 having an outboard flange 62 thereon connected to a locater and seal ring 64.

A continuous pilot flame tube assembly 65 constructed in accordance with the present invention has a shield 66 which fits into ring 64 to seal therearound. An upper edge 68 of shield 66 is welded to a support body 70. The shield 66 includes a pilot flame tube 72 within the primary combustion zone 46. A connector flange 74 on the body 70 is connected by suitable fastener means 76 to a segment 78 of an engine wall which surrounds a part of the pressurizable chamber 16.

Electrical ignition of continuous pilot fuel occurs from a spark igniter 80 also supported within body 70. A shield pocket 82 receives the igniter 80 and locates electrode tips adjacent a side port 84 in tube 72 as best seen in FIG. 3. A flame sensing rod 86 also enters body 70 and has its tip located adjacent the outlet of pilot flame tube 65 to sense ionization therein which occurs when a pilot flame is lighted.

The flame sensing rod 86 produces a signal at lead 88 which indicates ionization produced by a pilot flame at the tip of the flame rod 86. Lead 88 signal is directed to controller 90 which produces an output signal on line 92 to condition a solenoid operated main fuel valve 94 to initiate main fuel flow through manifold 22 when the improved continuously operated pilot flame assembly 65 of the present invention has a pilot flame produced within the flame tube 72 portion thereof.

In accordance with one aspect of the present invention the pilot flame 95 is maintained within the confines of the shield tube 66 so that it will not be blown out during engine operation. The size of flame 95 is established by fuel flow through a first fuel supply conduit 96 from a fuel source 98 in the engine.

The pilot flame under this phase of continuous pilot operation constitutes a controlled heat source added to the reaction zone or chamber 46 of the combustor. The added heat source stabilizes the lean combustion flame near its lean air/fuel ratio blowout limit of operation. When the heat source presented by the pilot flame from the fuel source 98 is added to the reaction zone, it reduces the requirement for higher reaction zone temperatures and thus reduces formation of oxides of nitrogen in the combustor throughout combustor operation. More particularly, because of the added heat produced by the pilot flame as produced from the fuel source 98, it has been found that the temperature in the reaction zone 46 can be approximately 100° F. below that which would otherwise cause a blowout to occur for lean air/fuel ratios. The reduction in overall combustion mixture temperatures within the reaction zone 46 lowers the creation of oxides of nitrogen in the main fuel-/air mixture entering the reaction zone 46 from the prechamber.

In the illustrated arrangement the pilot assembly 65 is a direct heat source in the form of a flame as produced by the flow of fuel from the fuel source 98. The flame is mixed into a 45° portion of the early swirling region of the reaction chamber 46 immediately downstream of the orifice dam 54.

The improved pilot flame tube assembly 65 is inserted as a single unit with all components carried on a single support body 70. It is sealed with respect to the preferred 45° location to produce a desired heat increase independent of that produced by reaction of the multiple air/fuel supplies directed into the reaction zone 46.

A further feature of the present invention is found in the manner of control of fuel supply to the assembly 65.

More particularly, in the illustrated arrangement and with the multiple air/fuel supply sources of the type shown, it is observed that during both engine fuel start and stop a residuum of hydrocarbon based fuels can be directed into the reaction zone 46 from the chamber. The level of the fuel quantities are so small as to produce an air/fuel mixture, for a short period of time during both engine start and engine stop, which is below the flammability limits of the fuel.

During this phase of operation, the pilot flame 95 which is formed by flow of fuel from nozzle 101 and conduit 96 is protected from blowout by the shield 66. It will not combust all of the residuum of fuel. Accordingly, a control system 100 is associated with the fuel supply to the assembly 65 and includes a step-controlled solenoid operated valve 102 that receives a signal from the controller 90 when a throttle 104 is positioned in a start or stop control position. At either point, the residuum of unburned fuel in either of the multiple fuel/air mixtures passing into the reaction zone or chamber 46 is subjected to a pilot flame plume 106 of increased size produced by increased fuel flow through the valve 102 at both engine fuel start and stop. The plume 106 as shown in FIG. 1 flares outwardly into the reaction chamber along the 45° angle to intercept the swirling air/fuel mixture in reaction zone 46. Even though the mixture is below fuel flammability limits at both engine fuel stop and start, the flared pilot flame plume 106 constitutes a sufficient elevated temperature source within the reaction chamber to raise the residuum of fuel and air mixed therewith into a flammable range thereby to produce combustion of hydrocarbons therein so as to reduce the overall hydrocarbon emissions from the combustor.

While the embodiments of the present invention as herein disclosed constitute a preferred form, it is to be understood that other forms might be adopted.

The embodiments of the invention in which an exclusive property or privilege is claimed are defined as follows:

1. In an automotive gas turbine engine having a fuel supply for a combustor of the type including a primary inlet prechamber for prevaporization of fuel and mixing of fuel with air and an outer combustor wall in communication with the outlet end of the prechamber to define a primary reaction chamber and including an annular flash preventor therebetween, the improvement comprising: fuel injection means for directing a swirling fuel/air mixture through the prevaporization prechamber and into the primary reaction chamber, a continuously operated pilot flame tube assembly supported on the combustor wall including a shield tube extending into the primary reaction zone approximately 45° to an initial air/fuel swirl therein and operative to maintain a continuous ignition flame within the primary combustion zone during engine operation, said continuously operated pilot flame tube assembly being located downstream of the fuel injection means to prevent premature flame-out of the main reaction chamber combustion in the swirling fuel/air mixture during engine operation, and producing a heat source independent of heat produced in combustion of the fuel/air mixture to lower the combustion temperature required in the reaction zone swirl pattern thereby to reduce formation of oxides of nitrogen.

2. In an automotive gas turbine engine having a fuel supply for a combustor of the type including a primary inlet prechamber for prevaporization of fuel and mixing of fuel with air and an outer combustor wall in communication with the outlet end of the prechamber to define a primary reaction chamber and including an annular flash preventor therebetween, the improvement comprising: a continuously operated pilot flame tube assembly supported on the combustor wall including a shield tube and operative to maintain a continuous ignition flame within the primary reaction chamber during engine operation, fuel prevaporization means for directing a swirl pattern fuel/air mixture through the prevaporization prechamber and into the primary reaction chamber, said continuously operated pilot flame tube assembly being located downstream of the fuel prevaporization means to prevent premature flame-out in the primary reaction chamber combustion during engine operation, said fuel prevaporization means producing a residuum of unburned hydrocarbons and air mixture at the outlet of the prechamber at both engine fuel start and stop with an air-to-fuel ratio below the flammability limit of the fuel in the fuel/air mixture, a first fuel supply to said pilot flame tube assembly operative during engine operation to produce a first pilot flame fuel flow to generate a pilot flame located entirely within the shield tube of the pilot flame tube assembly to prevent blowout of the pilot flame during gas flow thereacross produced from idle to full power engine operation, and means including a step controlled valve operative in response to both combustor start-up and combustor stop commands to produce a greater flow of fuel to the pilot flame tube assembly at engine fuel start and stop to produce an extended flame plume that flares outwardly of the shield tube of said pilot flame tube assembly into the reaction chamber to intercept said unburned residuum of fuel and operative to combust said residuum of fuel to reduce the total hydrocarbon emissions from the combustor.

3. In an automotive gas turbine engine having a fuel supply for a combustor of the type including a primary inlet prechamber for prevaporization of fuel and mixing of fuel with air and an outer combustor wall in communication with the outlet end of the prechamber to define a primary reaction chamber and including an annular flash preventor therebetween, the improvement comprising: a continuously operated pilot flame tube assembly supported on the combustor wall including a shield tube and operative to maintain a continuous ignition flame within the primary reaction chamber during engine operation, fuel prevaporization means for directing a swirl patterned fuel/air mixture through the prevaporization prechamber and into the reaction chamber, said continuously operated pilot flame tube assembly being located downstream of the fuel prevaporization means to prevent premature flame-out in the primary reaction chamber combustion during engine operation and producing a heat source independent of heat produced in combustion of the fuel/air mixture to lower the combustion temperature required in the reaction zone swirl pattern thereby to reduce formation of oxides of nitrogen, said fuel prevaporization means producing a residuum of unburned hydrocarbons and air mixture at the outlet of the prechamber at both engine fuel start and stop with an air-to-fuel ratio below the flammability limit of the fuel in the fuel/air mixture, a first fuel supply to said pilot flame tube assembly operative during engine operation to produce a first pilot flame fuel flow to generate a pilot flame located entirely within the shield tube of the pilot flame tube assembly to prevent blowout of the pilot flame during gas flow thereacross produced from idle to full power engine operation, and means including a step-controlled valve operative in response to both combustor start-up and combustor stop commands to produce a greater flow of fuel at engine fuel start and stop to the pilot flame tube assembly thereby to produce an extended flame plume that flares outwardly of the shield tube of said pilot flame tube assembly into the reaction chamber to intercept said unburned residuum of fuel and operative to combust said residuum of fuel to reduce the total hydrocarbon emissions from the combustor.

4. A pilot flame tube assembly for control of combustion in a gas turbine engine combustor having a main fuel supply and a start fuel supply directed into a primary reaction zone at a dome end of the combustor, comprising: a support flange having spaced ports therein and means to attach the flange to a support member, a shield dependent from said flange including an axially extending flame tube with an open end located to intersect the reaction zone, said shield having a pocket portion thereon with an axis inclined to said flame tube and opening to one of said ports and also opening into the interior of said flame tube, an outer annular collar on said shield surrounding said pocket and said flame tube and having an outer surface for engagement with a seal assembly to seal the tube assembly with respect to an access port through the dome end of the combustor, means on said flange to direct a combustible air/fuel mixture into said flame tube, spark igniter means in said pocket portion and operative to produce ignition of said air/fuel mixture within said flame tube when start fuel flows into the reaction chamber, said outer annular collar and said flame tube defining a second open region within said shield in communication with the other flange port and the interior of the flame tube adjacent its open end, and a flame sensing rod supported on said flange and extending through said open region to sense ionization produced by a flame within the flame tube for producing a signal for use in initiating main fuel flow to the reaction chamber, and means for removably attaching said flange to the support member whereby the flame tube, igniter and flame rod can be accurately prearranged and spaced with respect to one another and thereafter secured in an operative relationship to the dome end of a combustor.

* * * * *